United States Patent [19]
Fierkens et al.

[11] Patent Number: 4,781,282
[45] Date of Patent: Nov. 1, 1988

[54] AUTOMATIC CONTINUOUSLY CYCLEABLE MOLDING SYSTEM AND METHOD

[75] Inventors: Richardus H. J. Fierkens, Herwen; Ireneus J. T. Maria Pas, Rozendaal, both of Netherlands

[73] Assignee: ASM Fico Tooling B.V., Herwen, Netherlands

[21] Appl. No.: 798,568

[22] Filed: Nov. 15, 1985

Related U.S. Application Data

[62] Division of Ser. No. 586,855, Mar. 6, 1984, Pat. No. 4,575,328.

[51] Int. Cl.⁴ .............................................. B65G 47/26
[52] U.S. Cl. .................................... 198/414; 198/419; 198/436
[58] Field of Search ............... 198/414, 419, 434, 436, 198/437; 414/62, 68

[56] References Cited

U.S. PATENT DOCUMENTS 3,045,802 7/1962 Miller .................................. 198/414
3,315,785 4/1967 Shiffer .................................. 198/419

FOREIGN PATENT DOCUMENTS 2205153 8/1973 Fed. Rep. of Germany ...... 198/414

*Primary Examiner*—Joseph E. Valenza
*Attorney, Agent, or Firm*—Harry M. Weiss & Associates

[57] ABSTRACT

A receiving and arranging apparatus for bringing electronic components, or other workpieces, into a molding apparatus and unloading them from suitable magazines into a mechanism which arranges them in a proper orientation for placement into a mold. The apparatus includes a vertically movable and horizontally rotatable turntable mechanism which operates in conjunction with a conveyor system to arrange the electronic components in a side by side manner for transfer to a subsequent workstation in the molding process.

2 Claims, 2 Drawing Sheets

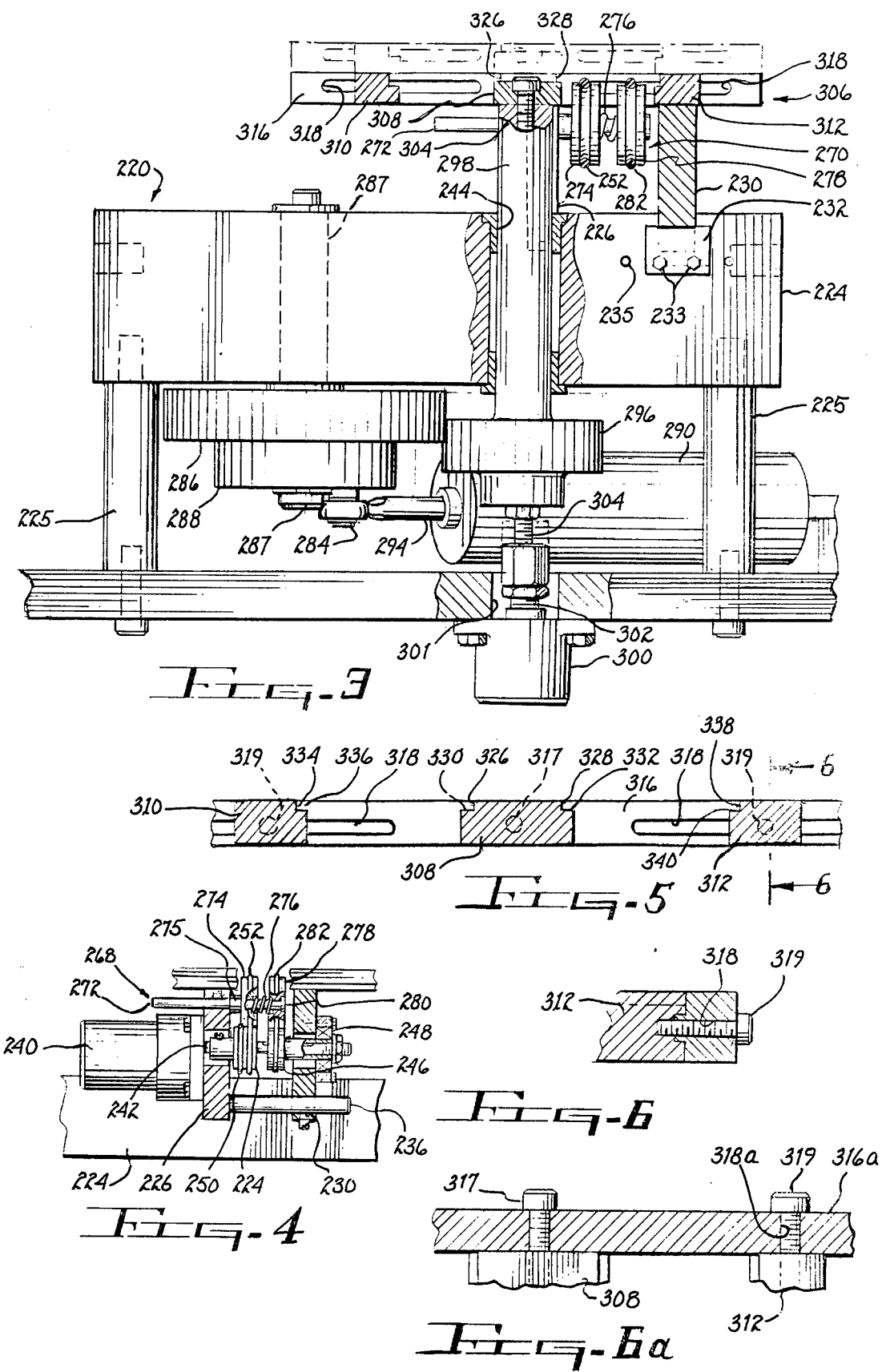

AUTOMATIC CONTINUOUSLY CYCLEABLE MOLDING SYSTEM AND METHOD

This is a divisional Patent Application of Application Ser. No. 586,855 filed Mar. 6, 1984 now U.S. Pat. No. 4,575,328 issued Mar. 11, 1986.

BACKGROUND OF THE INVENTION

1. Field of the Invention

The present invention generally relates to a workpiece receiving and arranging mechanism and, more specifically to a receiving and arranging mechanism for bringing electronic components, or other workpieces, into a molding apparatus and unloading them from suitable magazines into a mechanism which arranges them for placement into a mold.

2. Description of the Prior Art

Over the years various mechanical arrangements have been developed for use in the manufacturing of equipment utilized in fabrication of semiconductor packages. However, none of the past mechanical arrangements are believed to disclose the features that are hereinafter described.

SUMMARY OF THE INVENTION

It is an object of this invention to provide a workpiece receiving and arranging mechanism.

It is a further object of this invention to provide a workpiece receiving and arranging mechanism for use with electronic component molding or encapsulation systems.

The foregoing and other objects, features and advantages of this invention will be apparent from the following, more particular, description of the preferred embodiments of this invention, as illustrated in the accompanying drawings.

BRIEF DESCRIPTION OF THE DRAWINGS

FIG. 3 is an enlarged sectional view taken along the line 3—3 of FIG. 2.

FIG. 4 is an enlarged fragmentary sectional views taken along the line 4—4 of FIG. 2.

FIG. 5 is an enlarged fragmentary sectional view taken along the line 5—5 of FIG. 2.

FIG. 6 is an enlarged fragmentary sectional view taken along the line 6—6 of FIG. 5.

FIG. 6a is a fragmentary plan view, partially in section to show the various features of a modification of the workpiece receiving and arranging mechanism.

DESCRIPTION OF THE PREFERRED EMBODIMENT

Figure 1:
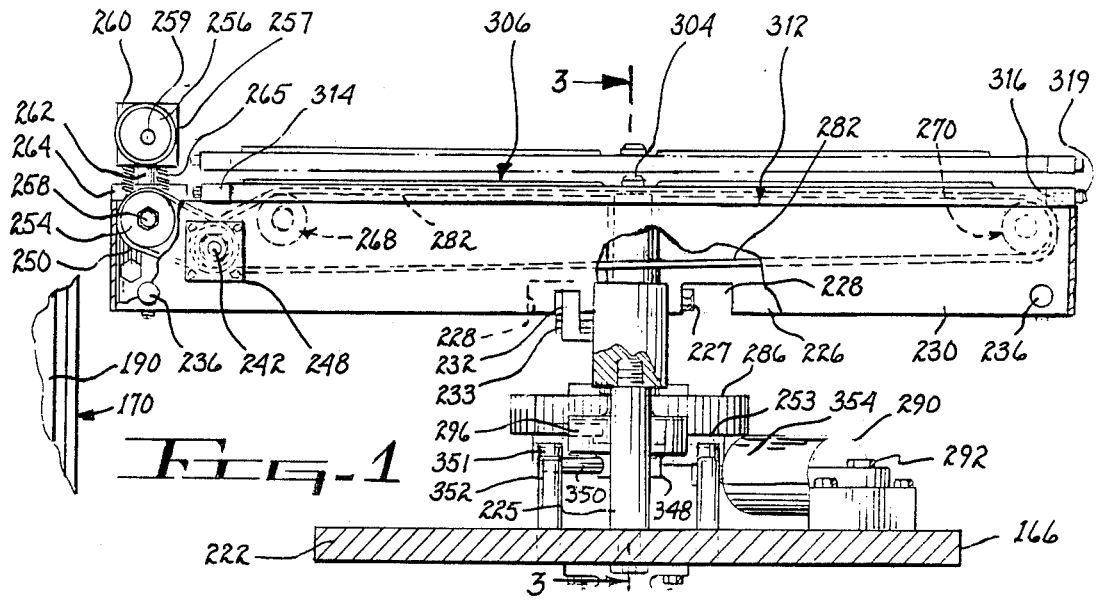
FIG. 1 is a side elevational view which is partially broken away to show the various features of a receiving and arranging mechanism for receiving the workpieces from the magazine transport and unloading sub-system and arranging them in a side-by-side relationship for subsequent placement in a bottom mold.

The operation which is accomplished in the subject work station is that of receiving the leadframes 102 which are offloaded from the magazines 190 and arranging them in a side-by-side position for subsequent transporting into another work station, wherein they are loaded into the bottom mold 110. The leadframe receiving and arranging is accomplished by a receiving and arranging mechanism which is identified generally by the reference numeral 220, and is illustrated in FIGS. 1, 2, 3, 4, 5 and 6 of the drawings.

The receiving and arranging mechanism 220 is disposed in juxtaposed relationship with respect to an input magazine transport and unloading sub-system 170 as indicated in FIG. 1.

The arranging mechanism 220 is mounted on a cross member 222 of the system frame 166 and includes a beam 224 which is fixedly supported on a spaced pair of columns 225 in a position above the cross member 222. A first cross plate 226 is fixedly attached intermediate its opposite ends to the beam 224 by bolts 227 (one shown in FIG. 1) which are located in notches 228 provided in the first cross plate 226 for that purpose. A second cross plate 230 is adjustably attached intermediate its opposite ends to the beam 224 by a bracket 232 which has bolts 233 which may be selectively mounted in any pair of an array of internally threaded bolt holes 235, as seen in FIG. 3, to adjustably vary the spacing between the first and second cross plates 226 and 230 for reasons which will hereinafter be described in detail. In addition to the above described mounting of the first and second cross plates 226 and 230 to the beam 224, a pair of guide rods 236 are mounted on opposite ends of the first cross plate 226 and extend normally therefrom through suitable bores which are aligningly formed in opposite ends of the second cross plate 230. The guide rods 236 are employed to maintain parallelism between the two cross plates 226 and 230.

An electric motor 240 is mounted on the first cross plate 226 as seen best in FIG. 4, and the motor has an output shaft 242 which extends therefrom through aligned apertures formed in the cross plates 226 and 230. A first pulley 244 and a second pulley 246 are axially slidably positionable on the output shaft 242 and both are provided with suitable set screws by which they are adjustably attached to the output shaft 242 for rotation therewith. The extending end of the output shaft 242 is rotatably journaled in a suitable bearing 248 which is mounted on the second cross plate 230.

The first pulley 244 is employed to drive a pair of O-ring type belts 250 and 252. The first belt 250 is employed to transmit rotary motion to a pulley 254 which is vertically disposed below a pinch roller 256 which has an O-ring 257 on its peripheral surface. The driven pulley 254 is journaled for rotation about a stub axles 258 which is carried on the first cross plate 226. The pinch roller 256 is journaled for rotation about a stub axle 259 which is carried by a right angle plate 260 which is in turn carried on the upper end of a plunger 262 of a suitable solenoid 264, that is mounted on the first cross plate 226. The right angle plate 260 is biased to its normal upper position, shown in FIG. 1, by a pair of springs 265, and when the solenoid is energized, the plunger 262 will pull the right angle plate 260, and thus the pinch roller 256 downwardly toward the pulley 254. When a leadframe 102 is offloaded from magazine 190 in the manner hereinbefore described, it will be received tangentially above the driven pulley 254. The solenoid 264 is then energized to move the pinch roller 256 downwardly. The belt 250, which drives the pulley 254, and the O-ring 257 on the pinch roller will frictionally grip the opposite surfaces of the leadframe and move to the right as viewed in FIG. 1.

Figure 2:
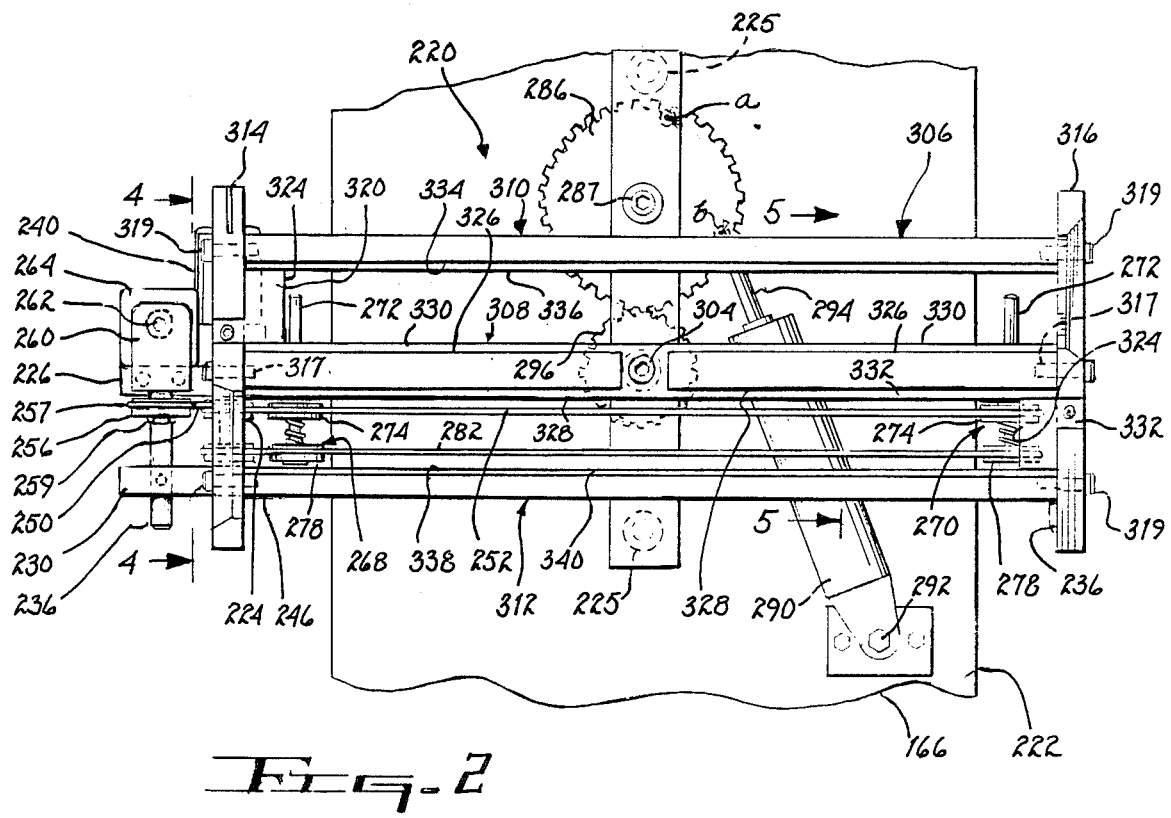
FIG. 2 is a plan view of the receiving and arranging mechanism of FIG. 1.

As seen in FIGS. 1 and 2, a pair of roller assemblies 268 and 270 are mounted on opposite ends of the first cross plate 226. These roller assemblies are identically configured in a manner best seen in FIG. 4. Since the roller assemblies 268 and 270 are identical, the following description of the assembly 268 will be understood to also apply to the roller assembly 270.

The roller assembly 268 includes an axle shaft 272 which is transverse with respect to the cross plate 226 and is slidably movable in an aperture formed therethrough. A suitable set screw is provided in the cross plate 226 to lock the axle shaft in the desired position. A first roller 274 is mounted for rotation about the axle shaft 272 with this roller 274 also being axially slidable thereon. The roller 274 is provided with an axially extending hub 275 which is held in abutting engagement with the cross plate 226 by means of a spring 276. The spring 276 is disposed between the first roller 274 and a second roller 278 which is also mounted for rotation about the axle shaft 272 adjacent the extending end thereof. The axle shaft 272 is provided with an enlarged head 280 on its extending end to hold the second roller 278 in place on the end of the axle shaft. The spring 276 holds the second roller 278 against axial movement in the direction away from the head 280 and also holds the first roller 274 so that its hub 275 is in bearing engagement with the first cross plate 226. In this manner, the spacing between the two rollers 274 and 278 can be adjusted by simply loosening the set screw of the axle shaft and slidably moving the axle shaft in the aperture provided in the cross plate 226.

The first pulley 224, which is carried on the output shaft 242 of the drive motor 240, drives the second endless O-ring type belt 252 as hereinbefore mentioned. This second belt 252 is looped over the first roller 274 of the first roller assembly 268 and around the first roller 274 of the second roller assembly 270. The second pulley 246 which is carried on the output shaft 242 of the motor 240 drives another endless O-ring type belt 282 which is looped over the second roller 278 of the first roller assembly 268 and around the second roller 278 of the second roller assembly 270.

From the above, it will be seen that the first and second roller assemblies 268 and 270 along with the endless belts 252 and 282, form a conveyor which is driven by the two pulleys 224 and 226 which are carried on the output shaft of the motor 240. Further, as hereinbefore described, the spacing between the two cross plates 226 and 230, the two pulleys 224 and 246 and the spacing between the two rollers 274 and 278 of each of the roller assemblies 268 and 270 may be adjusted. Thus, the distance between the two endless belts 252 and 282 may be varied to suit the width dimension of the leadframe, or any other workpiece for that matter, which is being subjected to the molding process in the system 100.

As seen best in FIG. 3, a gear 286 is carried on the depending end of an axle shaft 287 which is vertically carried in the beam 224, and, the gear 286 is suitably journaled for rotation about the axis of the axle shaft 287. A cylindrical boss 288 extends axially from the bottom surface of the gear 286 and is fast for rotation therewith. A pin 289 extends from the boss 288 with the pin being disposed adjacent the periphery of the boss. A ram means 290 has one of its ends pivotably attached to the cross member 222 as at 292 in FIGS. 1 and 2. The extensible plunger 294 of the ram 290 has its extending end pivotably attached to the depending pin 289, and the ram is employed to rotatably and reciprocally move the gear 286 through approximately 90° of rotational movement between two positions identified as a and b in FIG. 2.

A second gear 296 is fixedly carried on a shaft 298 which is journaled for rotation and axially movable in a bore 299 formed vertically through the beam 224. The gear 296 is in meshing engagement with the gear 286 and is configured to provide a 2 to 1 gear ratio so that the gear 296 is driven by the gear 286 through approximately 180° of rotation when the gear 286 is rotated by the ram 290 in the manner described above. The shaft 298, and thus the gear 296, are axially movable in the bore 299 of the beam with such movement being accomplished by a linear actuator means 300 which is mounted below the cross member 222. The cross member 222 is provided with an aperture 301 through which the plunger 302 of the linear actuator 300 is axially reciprocally movable, with the plunger 302 being connected to the gear 296 by an elongated threaded bolt 304 about which the gear 296 and the shaft 298 are rotatably movable.

A turntable means 306 is fixedly attached to the uppermost end of the shaft 298 for rotation and axial movement therewith by means of the above mentioned threaded bolt 304. The turntable includes a center rail 208 which is attached intermediate its opposite ends to the upper end of the shaft 298, and an identical pair of side rails 310 and 312 which are parallel and disposed on opposite sides of the center rail 308. The aligned opposite ends of the center rails 308 and the opposite side rails 310 and 312 are connected to each other by end rails 314 and 316. The end rails 314 and 316 are connected between their opposite ends to the center rail 308 by suitable bolts 317. As shown in FIGS. 3, 5 and 6, the end rails 314 and 316 are provided with elongated slots 318 in which the bolts 319, which attach the opposite ends of the side rails 310 and 312 to the end rails 314 and 316, are slidably relocatable so that the spacing between the center rail 308 and the side rails 310 and 312 may be adjusted. This adjustment is provided so that the turntable 306 may be set to handle leadframes, or other workpieces, of various width dimensions as will become apparent as this description progresses.

An alternative to the adjustably positionable side rails 310 and 312, FIG. 6a shows a modified form of the turntable wherein the end rails are provided with apertures 318a (one shown), instead of the elongated slots 318, as shown in the modified end rail 316a. The center rail 308 is mounted in the hereinbefore described manner by means of the bolts 317 (one shown) and the side rails 310 and 312 (only 312 is shown in FIG. 6a) are fixedly but demountably mounted by means of the bolts 319 (one shown). With this modified form of the turntable, the spacing between the center and side rails may be adjusted by replacing a given set of the rails with another set having different width dimensions. A given set of the workpiece receiving and supporting rails is defined as including the center rail 308 and both of the side rails 310 and 312, or only the center rail 308, or only the two side rails 310 and 312, as needed to achieve the desired spacing.

The end rail 314 has a spacer block 320 removably attached thereto so as to be positioned between the center rail 308 and the side rail 310. The end rail 316 is provided with a similar spacer block 322 which is removably attached thereto so as to be disposed between the center rail 308 and the opposite side rail 312. These spacer blocks 320 and 322 are identical to each other and are employed to insure that the spaces between the center rail 308 and the opposite side rails 310 and 312 are identical. Additionally, the spacer blocks 320 and 322 have stop surfaces 324 which serve to precisely locate the leadframes, or other workpieces, longitudinally on the turntable 306. The spacer blocks 320 and 322 shown in the drawings are demountably attached to their respective end rails 314 and 316, as indicated above, and may be replaced with spacer blocks (not shown) which have different dimensions to position the side rails 310 and 312 at appropriate positions to suit the width dimensions of the leadframes of other workpieces, and to locate the stop surfaces as needed to suit the length dimensions of the leadframes of other workpieces.

As seen best in FIGS. 2 and 5, the center rail 308 is configured to provide longitudinally extending right angle notches 326 and 328 in the opposite edges of the top surface of the center rail, with these notches forming recessed horizontal ledges 330 and 332, respectively. The side rail 310 is provided with a similar longitudinally extending right angle notch 334 in the edge of the top surface thereof which is nearest to the center rail 308, with this notch 334 forming a recessed horizontal ledge 336. Likewise, the other side rail 312 is formed with a longitudinally extending right angle notch 338 in the edge of the top surface thereof which is nearest to the center rail 308 with this notch 338 providing a recessed horizontal ledge 340. All of the ledges 330, 334, 336 and 340 lie in the same horizontal plane and serve a purpose which will hereinafter be described in detail.

When a first one of the leadframes 102 is ejected from the magazine 190 and is received between the pulley 254 and the pinch roller 256, it will be propelled onto the conveyor belts 252 and 282, the upper runs of which, as seen best in FIG. 2, are located in the space between the center rail 308 and the side rail 312. Thus, the conveyor belts 252 and 282 will propel this first leadframe into that space on the near side of the center rail 308 as viewed in FIG. 2. The leading edge of the leadframe will move into engagement with the stop surface 324 of the spacer block 322, and the first leadframe will be restingly supported on the recessed horizontal ledge 332 of the center rail 308 and the recessed horizontal ledge 340, of the side rail 312. Thus, the longitudinal position of the leadframe is accurately determined by the spacer block 332 and the lateral position is precisely determined by the vertical side surfaces of the right angle notches 328 and 338 of the center rail 308 and the side rail 312, respectively.

The turntable means 306 is then raised, to the position shown in phantom lines in FIG. 1, to clear the conveyor belts 252 and 282, and then the turntable means 306 is rotated through 180°, and the turntable is then lowered to its solid line position. When turned end for end in this manner, the space between the center rail 308 and side rail 312 in which the first leadframe is disposed as described above, will swap places with the empty space between the center rail 308 and the other side rail 310. The turntable means is then disposed to receive a second leadframe which is deposited in the space between the center rail 308 and the other side rail 310 in the manner hereinbefore described.

As seen in FIG. 1, an axial boss 348 depends from the gear 296 and a pin 350 extends radially therefrom. A pair of spaced posts 351 and 352 are mounted on the cross member 222 so as to extend upwardly therefrom on one side of the boss 348. An identical pair of spaced posts 353 and 354 are provided on the diametrically opposed side of the boss 348. These pairs of posts 351, 352 and 353, 354 are employed to precisely limit rotational movement of the turntable mechanism 306 to 180° of rotation. When the turntable 306 is elevated, as it is during rotation, the radial pin 350 will rotate to a position between the pins 351 and 352 in one direction of rotation, and a position between the pins 353 and 354 in the opposite rotational direction.

The pair of the leadframes 102, arranged on the turntable mechanism 306 in side-by-side relationship in the above described manner, are now ready to be moved from the subject work station.

While the invention has been particularly shown and described in reference to the preferred embodiments thereof, it will be understood by those skilled in the art that changes in form and details may be made without departing from the spirit and scope of the invention.

We claim:

1. A mechanism for receiving and arranging at least a pair of workpieces, comprising, in combination:
   (a) a turntable means for having a vertical rotational axis, said turntable means being configured to define first and second centrally open workpiece supporting areas on opposite sides of said vertical rotational axis thereof;
   (b) an elevating means coupled to said turntable means for reciprocally moving said turntable means between elevated and lowered positions thereof; and
   (c) a conveyor means positioned only on one of said sides of said vertical rotational axis of said turntable means in alignment with the fixed linear path of the workpieces for receiving a first one of at least a pair of said workpieces wherein said workpieces are serially moved along a linear path, said workpieces being received when said turntable means is in said lowered position, said workpieces being arranged in a side by side relationship by said mechanism, said conveyor means being disposed within said workpiece supporting area on said one of said side of said vertical rotational axis of said turntable means for moving said first one of said workpieces to a position above said first workpiece support area when said turntable means is lowered and in the first rotational position thereof so that when said turntable means is moved to the elevated position thereof by operation of said elevating means, said turntable means will lift said first workpiece off of said conveyor means and said first workpiece will become supported in said first workpiece support area of said turntable means.

2. The mechanism for receiving and arranging at least a pair of workpieces as in claim 1 wherein said conveyor means is being disposed for subsequently receiving and moving said second workpiece into a position above said second workpiece support area when said turntable means is lowered and in said second rotational position thereof so that upon operation of said elevating means to move said turntable means to the elevated position, the second workpiece will be lifted off of said conveyor means and will be supported on said second workpiece supporting area of said turntable means.

* * * * *